US010637232B2

(12) United States Patent
Toda et al.

(10) Patent No.: US 10,637,232 B2
(45) Date of Patent: Apr. 28, 2020

(54) ELECTRIC CIRCUIT DEVICE

(71) Applicant: Hitachi Automotive Systems, Ltd., Hitachinaka-shi, Ibaraki (JP)

(72) Inventors: Issei Toda, Hitachinaka (JP); Satoru Shigeta, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 246 days.

(21) Appl. No.: 15/736,333

(22) PCT Filed: Jun. 3, 2016

(86) PCT No.: PCT/JP2016/066524
§ 371 (c)(1),
(2) Date: Dec. 14, 2017

(87) PCT Pub. No.: WO2017/002527
PCT Pub. Date: Jan. 5, 2017

(65) Prior Publication Data
US 2018/0191153 A1  Jul. 5, 2018

(30) Foreign Application Priority Data
Jul. 1, 2015  (JP) .................... 2015-132319

(51) Int. Cl.
*H02H 7/20* (2006.01)
*H02H 11/00* (2006.01)
*H02H 3/08* (2006.01)

(52) U.S. Cl.
CPC .............. *H02H 7/20* (2013.01); *H02H 3/085* (2013.01); *H02H 11/002* (2013.01)

(58) Field of Classification Search
CPC ......... H02H 7/20; H02H 11/002; H02H 3/085
(Continued)

(56) References Cited

U.S. PATENT DOCUMENTS

2006/0250175 A1  11/2006  Meier
2010/0284114 A1*  11/2010  Kilroy ................. H02H 3/202
                                                                   361/86
2014/0257632 A1  9/2014  Kanzaki et al.

FOREIGN PATENT DOCUMENTS

JP          47-23846 A      10/1972
JP          47-26649 A      10/1972
(Continued)

OTHER PUBLICATIONS

International Search Report (PCT/ISA/210) issued in PCT Application No. PCT/JP2016/066524 dated Aug. 16, 2016 with English translation (5 pages).
(Continued)

*Primary Examiner* — Dharti H Patel
(74) *Attorney, Agent, or Firm* — Crowell & Moring LLP

(57) ABSTRACT

An internal electric circuit device that is connected to a connector terminal at the time of being short-circuited can be protected, but a load connected to the connector terminal has not been able to be protected. When a voltage of a cathode of a diode becomes a voltage equal to or more that an output voltage of a power source circuit by a short circuit of a positive terminal, an output voltage of an amplifier changes from the output voltage of the power source circuit to a voltage of a point connected to a negative power terminal of the OP amplifier. When the output voltage of the amplifier becomes 0 V, a voltage difference between the gate and the source of a switching element becomes equal to or more than a predetermined voltage. Therefore, the drain and the source of the switching element enter an open state, and the current flowing a negative terminal is blocked. Therefore, it is possible to protect a load from overcurrent.

5 Claims, 1 Drawing Sheet

(58) Field of Classification Search
USPC .......................................................... 361/91.1
See application file for complete search history.

(56) References Cited

FOREIGN PATENT DOCUMENTS

| | | |
|---|---|---|
| JP | 2002-271183 A | 9/2002 |
| JP | 2006-129697 A | 5/2006 |
| JP | 2008-92277 A | 4/2008 |
| JP | 2014-171346 A | 9/2014 |

OTHER PUBLICATIONS

Japanese-language Written Opinion (PCT/ISA/237) issued in PCT Application No. PCT/JP2016/066524 dated Aug. 16, 2016 (4 pages).

* cited by examiner

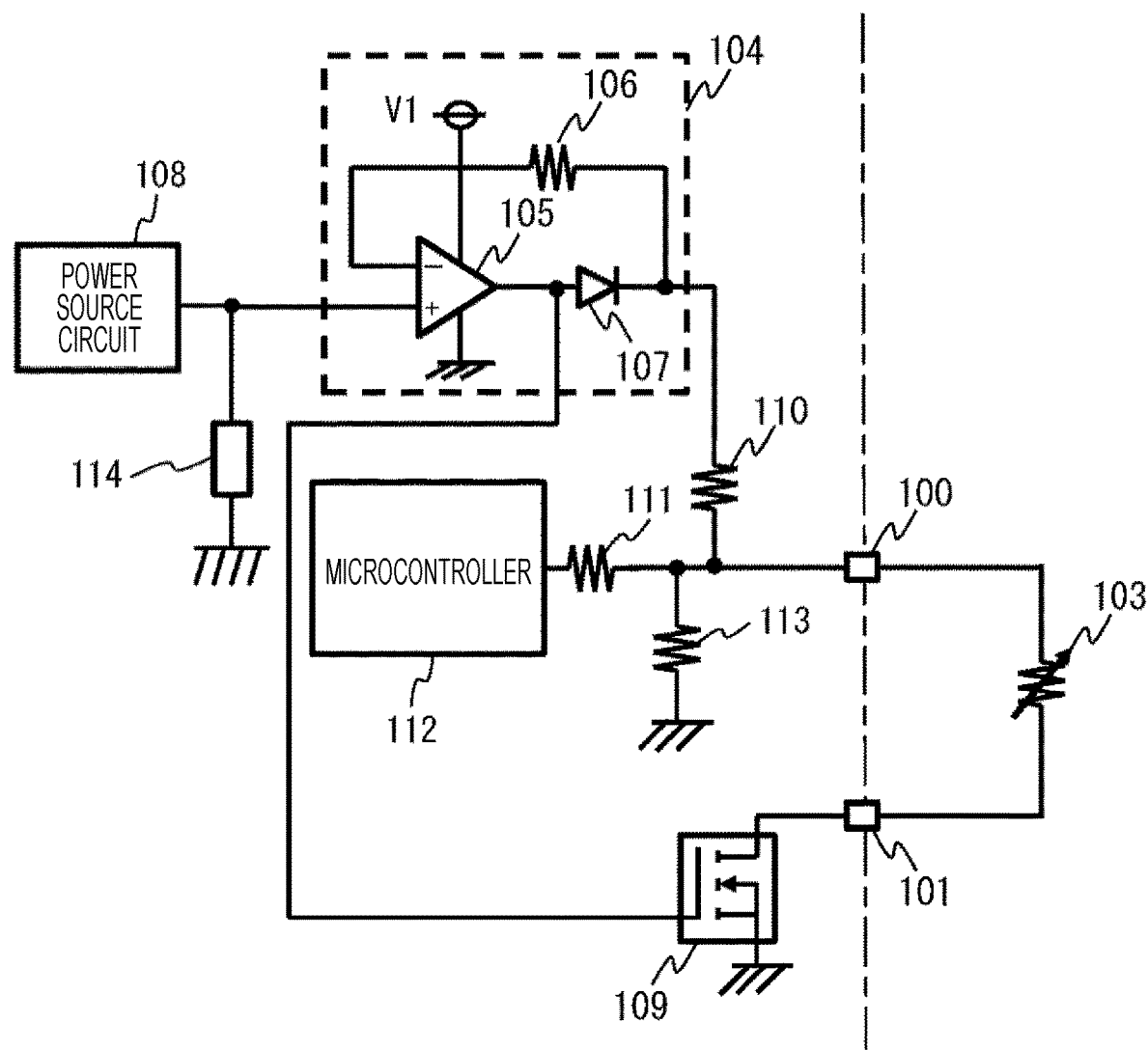

ELECTRIC CIRCUIT DEVICE

TECHNICAL FIELD

The present invention relates to an electric circuit device.

BACKGROUND ART

In a hybrid vehicle and an electric vehicle, the number of electric components is increased, and a number of connectors are mounted to electrically connect the electric components. A connector terminal in these connectors may be applied with a battery voltage due to a short circuit between terminals caused by a foreign material attached to the connector terminal or an erroneous wiring, and there is a possibility to be a so-called short-circuited state. In order to prevent a defect of the device caused by the short circuit, there is a need to remove an influence onto a load connected to the connector terminal and an internal electric circuit device.

For this reason, there is disclosed a configuration in which a voltage follower circuit and a lead-out resistor connected in parallel to the voltage follower circuit are provided in a short-circuit protecting circuit, a second output terminal is connected to one side of a parallel circuit made of the voltage follower circuit and the lead-out resistor, and the other side is connected to a second input terminal (PTL 1). Therefore, in a case where the connector terminal is short-circuited, a current flowing into the electric circuit device is controlled to prevent a defect of the electric circuit device.

CITATION LIST

Patent Literature

PTL 1: JP 2006-129697 A

SUMMARY OF INVENTION

Technical Problem

In a case where the method disclosed in PTL 1 above is used, an internal electric circuit device connected to the connector terminal can be protected at the time of being short-circuited, but a load connected to the connector terminal is not able to be protected.

Solution to Problem

An electric circuit device according to the present invention includes: a positive terminal and a negative terminal to which a load is connected; a power source circuit which supplies an output voltage; a reverse current prevention circuit which is connected between a side near the output voltage of the power source circuit and the positive terminal; and a switching circuit which is connected to the negative terminal, wherein the reverse current prevention circuit controls the switching circuit to block a current flowing from the positive terminal to the negative terminal through the load in a case where a voltage of the positive terminal is equal to or more than a predetermined value.

Advantageous Effects of Invention

According to the invention, it is possible to protect not only an internal electric circuit device connected to a connector terminal at the time of being short-circuited but also a load which is connected to the connector terminal.

BRIEF DESCRIPTION OF DRAWINGS

FIG. 1 is a circuit diagram of an electric circuit device.

DESCRIPTION OF EMBODIMENTS

FIG. 1 is a circuit diagram of an electric circuit device according to this embodiment. Hereinafter, a configuration of the electric circuit device will be described with reference to FIG. 1.

A load 103 is connected between a positive terminal 100 and a negative terminal 101 of a connector. In the positive terminal 100, a reverse current prevention circuit 104 is connected through a resistor 110.

The reverse current prevention circuit 104 is provided with an OP amplifier 105, a diode 107 which is connected to an output terminal of the OP amplifier 105, and a resistor 106 which is connected to the negative electrode side of the OP amplifier 105 from a cathode of the diode 107. A power source circuit 108 is connected to a positive electrode side of the OP amplifier 105. Further, the OP amplifier 105 is applied with power V1 and GND.

A junction between the output terminal of the OP amplifier 105 and an anode of the diode 107 is connected to a gate terminal of a switching element 109. The switching element 109 is a MOSFET (Metal Oxide Semiconductor Field Effect Transistor) for example. A drain terminal of the switching element 109 is connected to the negative terminal 101 of the connector, and a source terminal of the switching element 109 is connected to GND.

In addition, a microcontroller 112 is connected to the positive terminal 100 of the connector through a resistor 111. A junction between the positive terminal 100 and the resistor 111 is connected to GND through a resistor 113. The power source circuit 108 is used as a power source of various types of sensors, and herein is connected to a current sensor 114 as an example.

Next, an operation of the electric circuit device will be described with reference to FIG. 1. In a case where a battery voltage (for example, 14 V), which is not illustrated, is short-circuited to the positive terminal 100 due to a short circuit between terminals caused by a foreign material attached to a connector terminal and an erroneous wiring of the connector, a voltage of the positive terminal 100 becomes a voltage value equal to or more than an output voltage (for example, 5 V) of the power source circuit 108 which supplies power.

When a voltage of the cathode of the diode 107 becomes a voltage equal to or more that the output voltage of the power source circuit 108 by the short circuit of the positive terminal 100, an output voltage of the OP amplifier 105 changes from the output voltage (5 V) of the power source circuit 108 to a voltage (0 V) of a point connected to a negative power terminal of the OP amplifier 105.

When the output voltage of the OP amplifier 105 becomes 0 V, a voltage difference between the gate and the source of the switching element 109 becomes equal to or more than a predetermined voltage. Therefore, the drain and the source of the switching element 109 enter an open state, and the current flowing to the negative terminal 101 is blocked. In other words, the switching element 109 is controlled by using a change of the output voltage of the OP amplifier 105 caused by the short circuit of the positive terminal 100. Therefore, it is possible to protect the load 103 from overcurrent.

A resistor such as a thermistor of which the resistance varies according to a temperature may be used as the load 103 connected between the positive terminal 100 and the negative terminal 101. For example, an NTC (negative temperature coefficient) thermistor is a thermistor of which the resistance is reduced as the temperature rises, and the resistance at a high temperature is significantly smaller than that at a low temperature. However, even in a case where such a load 103 is used, it is possible to block the overcurrent flowing to the thermistor and to protect the thermistor by the circuit operation described above.

In addition, it is possible to prevent that the current flows to the power source circuit 108 at the time of being short-circuited in the positive terminal 100 by using the reverse current prevention circuit 104 for power supply of a reference voltage from the power source circuit 108. In general, a high accuracy power source is used for the power source circuit 108, but a load current is large, and a drive performance is not satisfied, and thus it is not possible to use a high accuracy power source. However, with the reverse current prevention circuit 104, it is possible to use a high accuracy power source for the power supply. Herein, the high accuracy power source indicates an accuracy of the output voltage of the power source. For example, in a case where a 10 mA current flows to the load, it is not possible to use a power source of which the rated output is a voltage of 5 V±0.5% and a current of max 5 mA for the power supply. The reason is that the power source is not able to output the current up to 5 mA while the load current requires 10 mA. In order to solve the problem, there is a need to use a power source which can generate a current equal to or more than the load current (10 mA) for the power source of the power supply. In that case, there is a possibility that the accuracy of the output voltage is worsened. However, when the reverse current prevention circuit 104 is used and, for example, a power source V1 of which the rated output is a voltage of 10 V±1% and a current of max 20 mA is used, the power source of which the rated output is a voltage of 5V±0.5% and a current of max 5 mA can be used as it is even in a case where a 10 mA current is required for the load 103, and the power supply is kept at 5 V±0.5% without any change. Further, the load current is supplied from the power source which is used in the OP amplifier 105. Therefore, with the use of the reverse current prevention circuit 104, it is possible to use a high accuracy power source for the power source circuit 108.

In addition, the power source circuit 108 is used as a power source of various types of sensors. For example, the current sensor 114 is connected. In a case where the output voltage of the power source circuit 108 is directly connected to the load 103, and when the battery voltage is short-circuited to the positive terminal 100, the current flows backward to the output voltage of the power source circuit 108. Further, there is a concern that a defect or a malfunction of various types of sensors connected to the output voltage of the power source circuit 108 may occur. For example, when the battery voltage is short-circuited to the positive terminal 100 regardless of a non-operating period (a stage of power OFF) of the vehicle system, the sensors may cause a malfunction, and it may cause an adverse effect on the entire system as the operation described above. As described in this embodiment, it is possible to prevent a defect or a malfunction of various types of sensors connected to the output voltage of the power source circuit 108 at the time of being short-circuited in the positive terminal 100 with the use of the reverse current prevention circuit 104.

According to the embodiment described above, the following operational effect can be achieved.

(1) The electric circuit device is provided with the positive terminal 100 and the negative terminal 101 to which the load 103 is connected, the power source circuit 108 which supplies the output voltage, the reverse current prevention circuit 104 which is connected between a side near the output voltage of the power source circuit 108 and the positive terminal 100, and the switching element 109 which is connected to the negative terminal 101. In a case where the voltage of the positive terminal 100 is equal to or more than a predetermined value, the reverse current prevention circuit 104 controls the switching element 109 to block the current flowing from the positive terminal 100 to the negative terminal 101 through the load 103. With this configuration, it is possible to protect not only various types of inner sensors connected to the positive terminal 100 at the time of being short-circuited but also the load 103 which is connected between the positive terminal 100 and the negative terminal 100.

The invention is not limited to the above embodiments, even other embodiments considered as falling within a scope of technical ideas of the invention are included within the scope of the invention as long as the features of the invention are not degraded.

REFERENCE SIGNS LIST 100 positive terminal
101 negative terminal
103 load
104 reverse current prevention circuit
105 OP amplifier
107 diode
108 power source circuit
109 switching element

The invention claimed is:

1. An electric circuit device comprising:
a positive terminal and a negative terminal to which a load is connected;
a power source circuit which supplies an output voltage;
a reverse current prevention circuit which is connected between a side near the output voltage of the power source circuit and the positive terminal; and
a switching circuit which is connected to the negative terminal,
wherein the reverse current prevention circuit controls the switching circuit to block a current flowing from the positive terminal to the negative terminal through the load in a case where a voltage of the positive terminal is equal to or more than a predetermined value, and
wherein the load is a resistor for detecting a state that a resistance varies according to a temperature.

2. An electric circuit device comprising:
a positive terminal and a negative terminal to which a load is connected;
a power source circuit which supplies an output voltage;
a reverse current prevention circuit which is connected between a side near the output voltage of the power source circuit and the positive terminal; and
a switching circuit which is connected to the negative terminal,
wherein the reverse current prevention circuit controls the switching circuit to block a current flowing from the positive terminal to the negative terminal through the load in a case where a voltage of the positive terminal is equal to or more than a predetermined value, and wherein a current sensor is connected to a side near the output voltage of the power source circuit.

3. The electric circuit device according to claim 2, wherein, in a case where a wiring from the positive terminal to the load is short-circuited, the reverse current prevention circuit determines that a voltage of the positive terminal is equal to or more than a predetermined value.

4. The electric circuit device according to claim 3, wherein the reverse current prevention circuit includes an OP amplifier which is connected to the positive terminal and a diode which is connected between an output terminal of the OP amplifier and a junction through which a path is negatively fed back to the OP amplifier, and wherein the switching circuit is controlled on the basis of a voltage between the output terminal of the OP amplifier and the diode.

5. An electric circuit device comprising:

a positive terminal and a negative terminal to which a load is connected;

a power source circuit which supplies an output voltage;

a reverse current prevention circuit which is connected between a side near the output voltage of the power source circuit and the positive terminal; and a switching circuit which is connected to the negative terminal, wherein the reverse current prevention circuit controls the switching circuit to block a current flowing from the positive terminal to the negative terminal through the load in a case where a voltage of the positive terminal is equal to or more than a predetermined value, wherein, in a case where a wiring from the positive terminal to the load is short-circuited, the reverse current prevention circuit determines that a voltage of the positive terminal is equal to or more than a predetermined value, and wherein the reverse current prevention circuit includes an OP amplifier which is connected to the positive terminal and a diode which is connected between an output terminal of the OP amplifier and a junction through which a path is negatively fed back to the OP amplifier, and wherein the switching circuit is controlled on the basis of a voltage between the output terminal of the OP amplifier and the diode.

* * * * *